(12) United States Patent
Rokosz (10) Patent No.: US 7,092,866 B2
(45) Date of Patent: Aug. 15, 2006

(54) SYSTEM AND METHOD FOR TIME COMPRESSION DURING SOFTWARE TESTING

(75) Inventor: Vaughn T. Rokosz, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/279,532

(22) Filed: Oct. 24, 2002

(65) Prior Publication Data

US 2003/0212989 A1    Nov. 13, 2003

Related U.S. Application Data

(60) Provisional application No. 60/379,315, filed on May 10, 2002.

(51) Int. Cl.
G06G 7/62    (2006.01)
(52) U.S. Cl. .................. 703/17; 327/175; 327/291; 713/501
(58) Field of Classification Search ............ 703/17, 703/22; 713/501; 327/175, 291; 714/731
See application file for complete search history.

(56) References Cited

U.S. PATENT DOCUMENTS

| | | | | |
|---|---|---|---|---|
| 4,413,350 A | * | 11/1983 | Bond et al. ............ | 377/47 |
| 6,067,411 A | * | 5/2000 | Poimboeuf et al. ......... | 713/400 |
| 6,441,666 B1 | * | 8/2002 | Swanson et al. ........... | 327/291 |
| 6,539,497 B1 | * | 3/2003 | Swoboda et al. ............ | 714/30 |
| 6,718,294 B1 | * | 4/2004 | Bortfeld ..................... | 703/20 |
| 6,941,400 B1 | * | 9/2005 | Hungerbuehler et al. ... | 710/301 |

* cited by examiner

Primary Examiner—Albert W. Paladini
(74) Attorney, Agent, or Firm—Kudirka & Jobse, LLP (57) ABSTRACT

A technique for applying time compression to simulate long-term execution of a software application in the short time frames includes providing simulated events to a software application under test and selectively advancing the system clock. The subject system utilizes two utility modules to interact with a software application under testing. The first module, the Event Simulation module, generates a range of predefine events which simulate the nature and frequency of events to which the software application would react. The second module, the Clock Modification module, intercepts the time signal generated by the operating system under which the software application is executing and modifies the clock signal, typically by advancing the time at a rate which is faster than one second per second, i.e., normal time rate. With the subject system, the behavior of an application over a simulated period may be observed in just a fraction of the simulated period duration, e.g. one year of simulated testing performance in five days. For systems or applications where behavior is influenced by the historical pattern of use, the disclosed technique for time compression can identify defects that normally occur only after extended periods of use.

28 Claims, 9 Drawing Sheets

SYSTEM AND METHOD FOR TIME COMPRESSION DURING SOFTWARE TESTING

RELATED APPLICATIONS

This application claims priority to commonly assigned U.S. provisional application Ser. No. 60/379,315, by Vaughn T. Rokosz, filed May 10, 2002 and entitled "System and Method for Time Compression During Software Testing."

FIELD OF THE INVENTION

This invention relates, generally, to data processing systems and, more specifically, to a technique for compressing the testing time of software applications.

BACKGROUND OF THE INVENTION

Following the design and coding of a software application for use with a computer system, the software is usually tested in the development environment or in actual field trials. One of the purposes of such testing is to detect any error or undesirable performance characteristics in the code. Time is often a factor in limiting the thoroughness with which an application is tested, due to many variables including too many code paths, too many operating systems, too many kinds of clients, etc. For some software, the problem of time is not one of schedule or resources. The performance of some software applications does not lend itself easily to short term diagnostic testing. Such software applications interact with users over long time periods and the history of these interactions influences software behavior. For example, in a collaborative filtering application that suggests merchandise by comparing a person's buying patterns to those of other people, defects may not surface until months or years of buying data have been collected, yet few developments projects can afford to spend so long testing the system. Accordingly, a need exists for a technique to test the performance of software which normally would take an extended period of time to observe. Another a need exists for a technique to compress the testing time for certain software, including knowledge management products, to a rate faster than one second per second.

SUMMARY OF THE INVENTION

The present invention provides a technique for applying time compression to simulate long-term execution of a software application in the short time frames. The technique includes providing simulated events to a software application under test and selectively advancing the system clock. The inventive system utilizes two utility modules to interact with a software application under testing. The first module, the Event Simulation module, generates a range of predefine events which simulate the nature and frequency of events to which the software application would react. The second module, the Clock Modification module, intercepts the time signal generated by the operating system under which the software application is executing and modifies the clock signal, typically by advancing the time at a rate which is faster than one second per second, i.e., normal time rate. With the subject system, the behavior of an application over a simulated period may be observed in just a fraction of the simulated period duration. e.g. one year of simulated testing performance in five days. For example, the Clock Modification module may cause the Event Simulation module and the software application under testing to experience time at a rate of two seconds for each second of the time signal generated by the operating system. i.e. twice as fast as normal time rate, or three seconds for each second of the time signal generated by the operating system. i.e. three times as fast as normal time rate. Alternatively, the Clock Modification module may advance the time signal generated by the operating system in larger increments, such as twenty-three hours each time a simulated event occurs. For systems or applications where behavior is influenced by the historical pattern of use, the disclosed technique for time compression can identify defects that normally occur only after extended periods of use.

According to a first aspect of the invention, a method for use with a computer system having an operating system executing thereon, the operating system capable of executing one of more applications and generating a system clock signal useful by one of the applications, the method comprising: (a) causing one of the applications to execute under control of the operating system; (b) providing one of a plurality of simulated events to the executing application; (c) selectively modifying the system clock signal generated by the operating system; and (d) providing the modified system clock signal to the executing application; In one embodiment, the method further comprises) repeating (b) through (d). In another embodiment, (c) further comprises selectively modifying the system clock signal by advancing the system clock signal at a rate greater that one second per second.

According to a second aspect of the invention, a computer program product and computer data signal for use with a computer system having an operating system executing thereon, the operating system capable of executing one of more applications and generating a system clock signal useful by one of the applications, the computer program product comprising a computer usable medium having program code contained thereon comprising: (a) program code for causing one of the applications to execute under control of the operating system; (b) program code for providing one of a plurality of simulated events to the executing application; (c) program code for selectively modifying the system clock signal generated by the operating system; and (d) program code for providing the modified system clock signal to the executing application, In one embodiment, the computer program product further comprises program code for repeating execution of (b) through (d). In another embodiment, (c) further comprises program code for selectively modifying the system clock signal by advancing the system clock signal at a rate greater that one second per second.

According to a third aspect of the invention, an apparatus for use with a computer system having an operating system executing thereon, the operating system capable of executing one of more applications and generating a system clock signal useful by one of the applications, the apparatus comprises: (a) program logic for causing one of the applications to execute under control of the operating system; (b) program logic for providing one of a plurality of simulated events to the executing application; (c) program logic for selectively modifying the system clock signal generated by the operating system; (d) program logic for providing the modified system clock signal to the executing application. In one embodiment, the apparatus further comprises (e) program logic for supplying an unmodified clock signal generated by the operating system to the application. In another embodiment, (c) further comprises program logic for selectively modifying the system clock signal by advancing the system clock signal at a rate greater that one second per second.

According to a fourth aspect of the invention, an apparatus for testing the performance of an application comprises: (a) a processor; (b) an operating system executing under control of the processor and configured to generate a system clock signal; (c) an application executing under control of the operating system; (d) a memory for storing data related to a plurality of simulated events; and (e) program logic for: i) providing data related to one of the plurality of simulated events to the executing application, ii) modifying the system clock signal, and iii) providing the modified system clock signal to the executing application, in a repeated sequence, until execution of the application stops. In one embodiment, the program logic for selectively modifying the system clock signal comprises program logic for advancing the system clock signal at a rate greater that one second per second.

According to a fifth aspect of the invention, a system for testing the performance of an application comprises: (a) a first computer system operatively coupled to a computer network and configured to execute an application under the control of an operating system, the application responsive to a clock signal generated by the operating system or from an external source; (b) a network clock signal source operatively coupled to the computer network for generating a network clock signal accessible over the computer network; (c) a simulated events source operatively coupled over the computer network to the application executing on the first computer system and to the network clock signal source, the selected of the simulated events supplied to the application at predetermined clock signal values; (d) program logic for selectively modifying the network clock signal generated by the network clock signal source and for providing the modified network clock signal to one of the executing application and the simulated events source, in a repeated sequence. In one embodiment, (d) further comprises program logic for advancing the system clock signal at a rate greater that one second per second.

BRIEF DESCRIPTION OF THE DRAWINGS

The above and further advantages of the invention may be better understood by referring to the following description in conjunction with the accompanying drawings in which.

DETAILED DESCRIPTION

Figure 1:
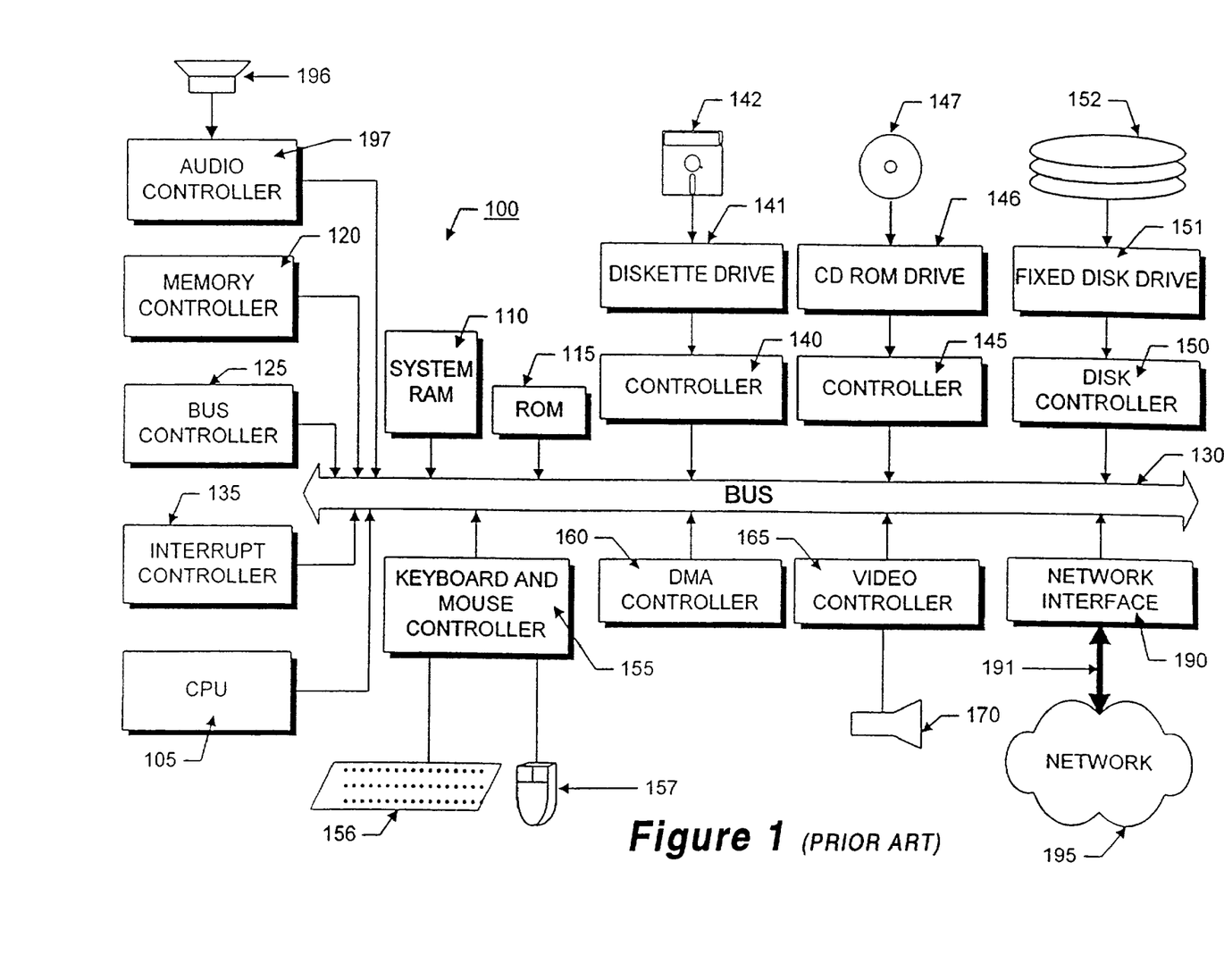
FIG. 1 is a block diagram of a computer system suitable for use with the present invention.

FIG. 1 illustrates the system architecture for a computer system 100, such as a Dell Dimension 8200, commercially available from Dell Computer, Dallas Tex., on which the invention can be implemented. The exemplary computer system of FIG. 1 is for descriptive purposes only. Although the description below may refer to terms commonly used in describing particular computer systems, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such as Windows NT or Windows 2000 operating systems, commercially from Microsoft Corporation, Redmond, Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including WINDOWS, OS/2, UNIX and DOS, LINUX, SOLARIS, etc. One or more applications 220 such as Lotus Discovery Server, Lotus Notes or Lotus Sametime, all commercially available from IBM Corporation. If operating system 210 is a true multitasking operating system, multiple applications may execute simultaneously.

In the illustrative embodiment, the present invention may be implemented using object-oriented technology and an operating system which supports execution of object-oriented programs. For example, the inventive system may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

Figure 2:
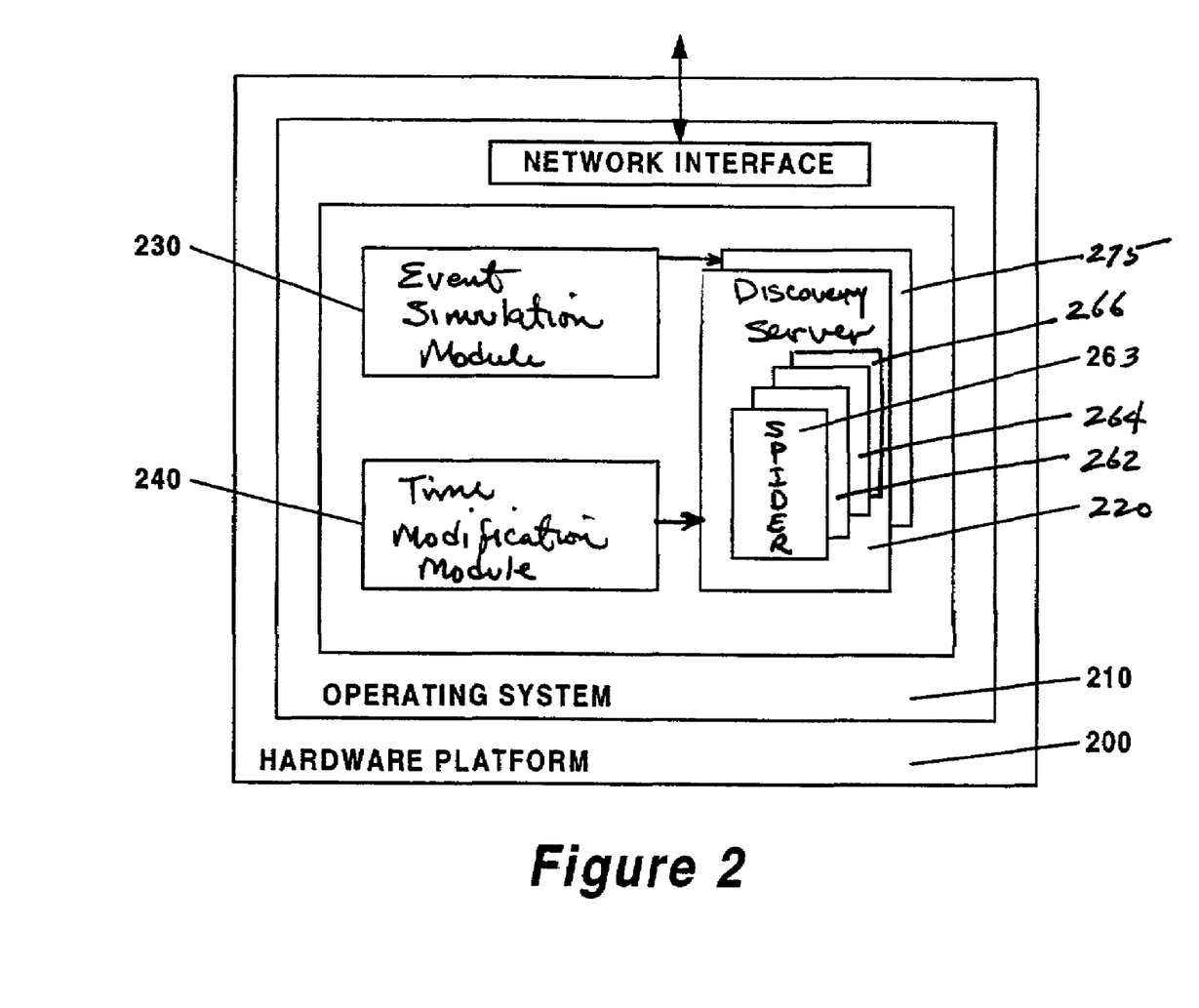
FIG. 2 illustrates conceptually the relationship between the components of the system in which the present invention may be utilized.

FIG. 2 is illustrates conceptually the relationship between the components of present invention and a system in which they may be utilized. In the illustrative embodiment, the software application 220 under test may be the Lotus Discovery Server, commercially available from IBM Corporation, Lotus Software Division, Cambridge, Mass. Application 220 executes under the control of operating system 210, such as Window NT operating system, which in turn executes within the hardware parameters of hardware platform 200, which may be similar to that described with reference to FIG. 1. To implement the primary functionality of the present invention, two routines or modules, referred to hereafter as Event Simulation module 230, also referred to herein as an Event Simulator 230, and Clock Modification module 240 are implemented to interact with the Discovery Server 220 application and its existing functionality, routines or commands, many of which are publicly available. It will be understood, however, by those reasonably skilled in the arts that other applications may be used with the system of the present invention, as will be apparent from the description contained herein. Prior to discussion of the Event Simulation module 230 and Clock Modification module 240, a detailed overview of the Lotus Discovery Server application 220 and its results in provided to help the reader understand how the invention can reduce the amount of time required for testing of certain software.

Discovery Server Application

The Lotus Discovery Server 220 is a knowledge management tool that extracts, analyzes and categorizes structured and unstructured information to reveal the relationships between the content, people, topics and user activity in an organization. The Lotus Discovery Server 220 automatically generates and maintains a Knowledge Map (K-map) to display relevant content categories and their appropriate hierarchical mapping that can be searched or browsed by users. The Lotus Discovery Server also generates and maintains user profiles and tracks relevant end-user activities, identifying those individuals who may be subject matter experts. Through such expertise profiling and content discovery the server uncovers organizational know-how in terms of where things are, who knows what, what is relevant, and which subjects generate the most interest and interactivity.

The Discovery Server 220 can analyze the content of a collection of documents, create clusters of related documents, and then organize those clusters into a tree of categories called a taxonomy. The Discovery Server 220 also indexes document content, and provides a user interface that supports both full-text and taxonomy-based searching.

The process of finding and analyzing documents is called spidering, and the Discovery Server 220 can spider a variety of document repositories, including file systems and collaborative applications, such as Lotus Notes or Microsoft Exchange. Once the taxonomy is created, the Discovery Server 220 periodically scans for new documents, and assigns the new documents to a category based on their similarity to the documents that are already in the category.

The Discovery Server 220 analyzes document usage patterns in order to associate people with categories. A person who frequently reads, writes, or responds to documents in a particular category is said to have an affinity for that category. The Discovery Server 220 creates and maintains expertise profiles for users, and stores the affinities that it detects in the expertise profiles. The Discovery Server's search interface supports affinity-based search, e.g. find people who have an affinity for "Java".

Figure 3:
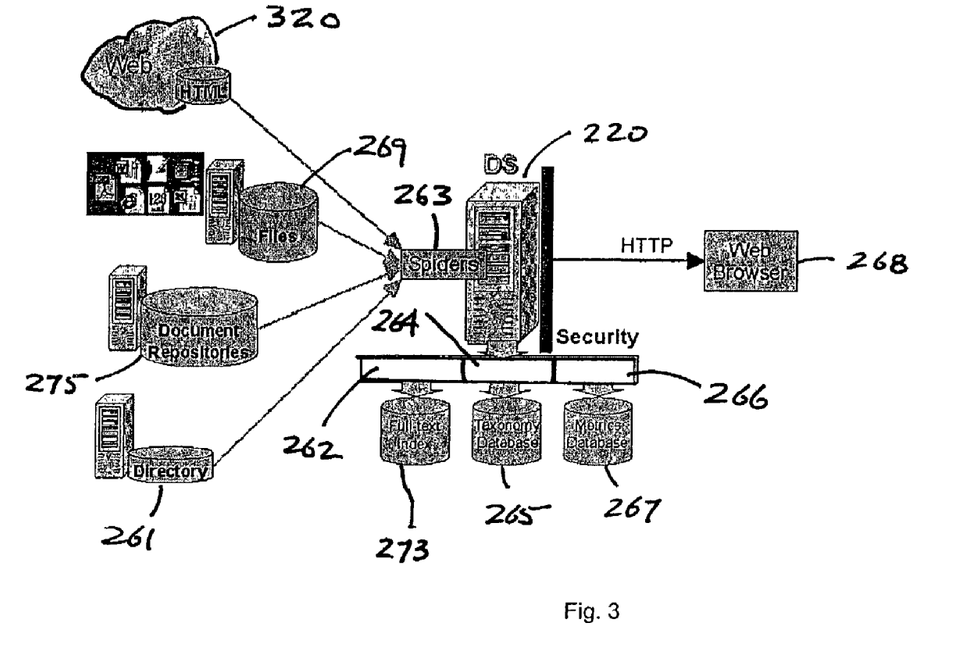
FIG. 3 illustrates conceptually an exemplary software application with which the present invention may be utilized.

The system architecture of the Discovery Server 220 is described with reference to FIG. 3. The Discovery Server 220 comprises spider modules 260, full-text indexer 262, taxonomy generator 264, metrics system 266 and web browser 268. The spider modules 260, also referred to herein as "spiders", are responsible for "crawling" documents, from a number of sources including HTML web based document accessible through the Internet 320, directories 261, and files 269, in order to extract content and convert the content into a normalized XML format. The normalized documents are then passed into subsystems 262, 264 and 266 within Discovery Server 220 and the results stored in the respective subsystem databases. A full-text indexer 262 creates a searchable index of the keywords found in the normalized documents for storage in database 263. Taxonomy generator 264 places the normalized documents into an appropriate category for storage in database 265. Metrics subsystem 266 tracks and analyzes usage patterns and calculates affinities for storage in database 267. A web browser 268 may then be used by the user to view or search the taxonomy generated by the Discovery Server 220.

The testing and performance of the Discovery Server 220 are described, in the illustrative embodiment, with reference to the calculation of affinities. Affinities are maintained by the Metrics subsystem 266 of the Discovery Server 220. The Metrics subsystem 266 collects information about the interactions between system entities such as people, documents, and categories. The interactions are inferred from the metadata extracted from documents by the spiders 263, or else from user interactions with the user interface of Discovery Server 260. Information describing each interaction is stored as a record in a table of taxonomy database 265, where each record may have a format similar to the following format:

| Entity 1 | Interaction Type | Entity 2 | Value | Timestamp |
|---|---|---|---|---|

The interactions between people and documents provide the raw data from which Metrics system 266 calculates affinity values. These interactions appear in the Metrics database 267 as records that may have a format similar to the following format:

| Entity 1 | Interaction Type | Entity 2 |
|---|---|---|
| Person | is author of | Document |
| Person | Modified | Document |
| Person | Responded to | Document |
| Person | opened | Document |
| Person | created links to | Document |

Other tables in the Discovery Server system associate documents with categories, so that it is possible to associate each document interaction with a category. The value of a person's affinity is updated once per day, and the value of the affinity at time t may be found as follows:

$$\text{Affinity}(t) = \text{Affinity}(t-1) + \Sigma(W_i \times M_i) - \text{Decay}(t-1)$$

where Mi is the count of a particular interaction type for a person within a category since the last affinity update, and Wi is a weighting factor for that interaction type. Weighting factors may range between 0 and 1. The decay may be calculated as follows:

$$\text{Decay}(t-1) = 0, \text{ if } \text{sum}(Wi \times Mi) > 0$$

$$\text{Decay}(t-1) = 0.01 \times \text{Affinity}(t-1), \text{ if } \text{sum}(Wi \times Mi) = 0$$

Accordingly, a person's affinity value for a category decays at 1% per day for each day where the person shows no document activity in that category. When the affinity value for a person in a category exceeds a threshold, the system adds the category to the person's expertise profile. The system may notify the person about the update via e-mail, so that the person can manually update their expertise profile, if the suggested category is not appropriate or should be kept private.

Under normal usage the Discovery Server 220 may run continuously, collecting and analyzing data over a long period of time, potentially years. The affinity values, for example, slowly build up as people work with documents, taking, possibly, months for a person's activity to accumulate to the point where an affinity was detected. Such affinity algorithm can also be modeled using the system of the present invention which includes a discrete event simulator, and clock modification module, as described hereafter.

Rather than testing application 220 over the course of a whole year to obtain results, the present invention uses Event Simulation module 230 and Clock Modification module 240, as well as other components, to emulate the behavior of the Discovery Server over long periods of time, but within a compressed time period. Event Simulation module 230 may be written as a utility in C++ programming language. The operation of the event simulation module 230 is described with reference to FIG. 5. Event Simulator 230 receives input data from user profiles 280 and source documents 285. Event Simulation module 230 simulates user activity by creating, modifying, or responding to documents at a controlled rate, specified as N document interactions every M days, as defined in one of the profiles in user profiles 280. The event simulator 230 maintains the document repository 275 by creating new documents, modifying existing documents, and creating responses to existing documents. The Event Simulator 230 interacts with the Discovery Server application 220, which may be Release 1 or higher, through document repository 275. In the illustrative embodiment, Event Simulation module 230 is designed with a user interface that allows the user to enter a specific time at which the Event Simulator 230 will execute and generate a simulated event. e.g. "12:01 AM". A system clock 270 supplies a clock signal, typically available via calls to the operating system, to both the Event Simulator 230 and Discovery Server application 220. The discovery server 220 periodically spiders the document repository 275. The discovery server detects the simulated document activity created by the event simulation and uses it to update the affinity calculations generated by metrics subsystem 266, as described previously.

Figure 5:
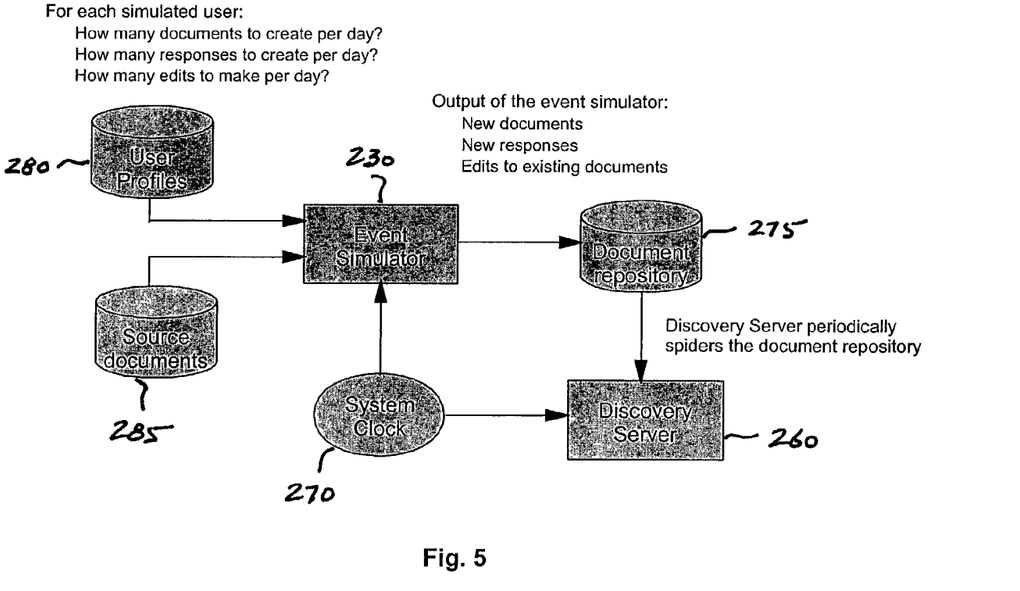
FIG. 5 illustrates conceptually the relationship between the event simulator and the other components of the inventive system.

In the illustrative embodiment, the event simulator 230 generates activity at a controlled rate, so that it is possible to predict the results of the discovery server's affinity calculations. The event simulator 230 draws on two sources of data. The first source of data for the event simulator is the user profiles 280 which contains a list of user profiles, one for each simulated user. The user profile specifies the rate at which the event simulator 230 should generate activity for a particular simulated user. An exemplary user interface presented by the event simulator for defining a user profile document is shown below:

Specify the rate of activity to be simulated for this user.

| User name: | Joe Doe/CAM/Lotus (full name) |
|---|---|
| # docs to create: | 1 |
| days between create events: | 2 |
| # docs to modify | 1 |
| days between modify events: | 2 |
| # responses: | 1 |
| days between responses: | 2 |

The second source of data for the event simulator is a set of source documents 285, including, but not limited to HTML web based document, directories, files and other document. These source documents are used by the event simulator when it simulates "Create" or "Response" events. When simulating a Create or Response event, the event simulator copies a source document into the document repository 275.

In the illustrative embodiment, Event Simulator 230 is configured to generate simulated activity once per day, at a time specified by the user. Event Simulator 230 wakes up once per minute, and checks the current time. If the current time is later than the time specified, the Event Simulator opens the User Profiles 280 and iterates through the User Profiles. For each profile, Event Simulator 230 checks to see whether it is time to generate activity for that user. If so, the Event Simulator generates the number of create, response, and modification events specified in the user profile. Event Simulator 230 keeps track of when each User Profile was last executed and determines if the specified number of days has elapsed. If so, the User Profile is executed. If not, the User Profile is skipped. For example, if a hypothetical User Profile specifies that one document is to be created every two days, when Event Simulator 230 determines that the User Profile has never been executed, the Event Simulator 230 will create one document in the document repository 275. The Event Simulator 230 will then enter wait loop, checking to see whether one day has elapsed. The next day, when the Event Simulator 230 checks the User Profile and determines that it was executed the prior day, the Event Simulator 230 skips the user profile. One day later, when the Event Simulator 230 checks the User Profile and determines that it was executed two days prior, the Event Simulator 230 executes the User Profile again.

Figure 6:
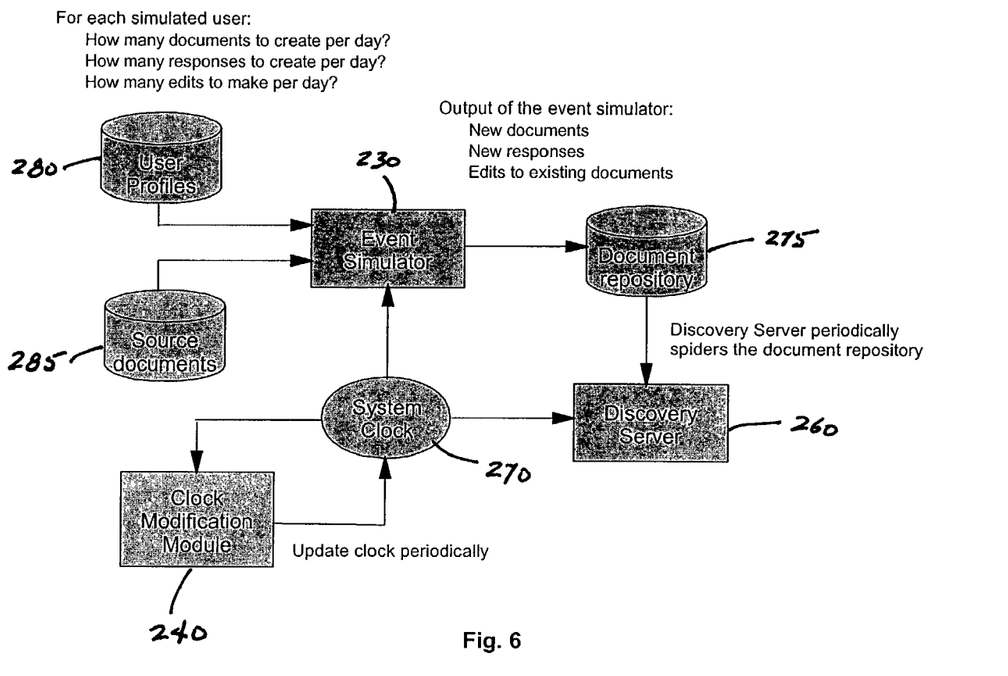
FIG. 6 illustrates conceptually the relationship between the clock modification module and the other components of the of the inventive system.

FIG. 6 illustrates the system of FIG. 5 with the addition of Modification module 240. The Clock Modification module 240 interacts with the Discovery Server 220 and Event Simulator 230 via system clock 270 so that that rate at which simulated events are generated and the subject application 220 is tested is greater than one second per second, i.e. the rate of normal time passage. The Clock Modification module 240 may be written as a utility in the C++ programming language. Clock Modification module 240 interacts with the operating system to update the system clock 270 on the computer system where the application 220 is being tested. The Clock Modification module 240 makes calls to the operating system API for the system time, and then modifies the system time application 220 as appropriate. The Discovery Server application 220 makes calls to the system clock 270 through operating system calls, and so the operation of Clock modification module 240 is transparent to application 220. As with Event Simulator module 230, Clock Modification module 240 may include a user interface, with any of command lines, dialogue boxes or selectable menu options, etc. that allows the user to enter a specific time at which the module 240 will execute and modify the system clock, e.g. "12:20". In the illustrative embodiment, Clock Modification Module 240 then advances the system clock to midnight of the following day on a given time.

An exemplary testing scenario for application 220, according to the illustrative embodiment, is set forth in the Table 1 below:

TABLE 1

| Time | Event |
|---|---|
| 12:00:01 | Event Simulator generates a controlled set of document interactions (creates, responses, modifications) |
| 12:01 | Discovery Server spiders execute |
| 12:10 | Metrics processing starts. The day's documents are processed and affinity values are updated. |
| 12:20 | The system clock is set ahead to midnight of the next day by the Clock Modification Module |

The Event Simulator 230 works, as described previously. However, the Clock Modification module 240 is set up to advance the system clock to midnight of the following day at a specified time. The Clock Modification module 240 wakes up once per second, and checks to see if the current time, as provided by the System Clock 270, is later than the time specified. If not, then the Clock Modification module 240 sleeps for one minute. If the time is later than the time specified, Clock Modification module 240 updates the System Clock 270 to midnight of the next day. In the above example, Clock Modification module 240 is configured to advance to the next day at 12:20:00 each day and will do nothing until it wakes up at 12:20:01, at which point it will set the System Clock 270 to 12:00:00 AM of the following day.

In the system illustrated in FIG. 6, the operation of the Clock Modification module 240 is transparent to the Event Simulator 230 and the Discovery Server 220, which will both run normally, looking at system clock 270 to see whether it is time for them to execute their respective tasks. In the example of Table 1, if the Event Simulator 230 is configured to run at 12:01:00 AM each day, and that the Clock Modification module 240 is configured to advance the System Clock at 12:20:00 AM each day, the Event Simulator will generate simulated document activity at 12:01:00 AM. The spiders 260 of Discovery Server 220 will execute at 12:01:00 AM. At 12:10:00 AM, Metrics subsystem 266 starts processing the day's documents and updates the affinity values within Metrics database 267. At 12:20:01 AM, Clock Modification module 240 will set the System Clock to 12:00:00 AM of the next day and the whole 19 minutes cycle repeats thereafter, with Event Simulator 230 waking up at 12:01:00 AM, to do its daily routine. As a result, the system effectively accelerates or compresses the passage of time for the testing of Discovery Server 220.

In this manner, the user may test various aspects of the system by advancing the system clock either uniformly or nonuniformly. If the system clock 270 is advanced at the same rate, e.g. to midnight of the next date after an event, or, one hour for each minute actually elapsed, the rate of advancement is said to be uniform. If, however, the rate by which the system clock 270 is advanced of is random, e.g. to 12:01 then to 12:21 then to 9:45 (as may be selected by the user), or, of uniform intervals after a random event, e.g. 10 hours beyond the time at which event processing terminates, the rate of advancement is said to be non-uniform. Any advancement of the clock beyond its current time is said to be greater that one second per second. It will be obvious to those skilled in the arts that if the granularity of the system clock includes fractional portions of a second, e.g. microseconds, milliseconds, nanoseconds, etc., and that any advancement of the clock at a rate greater than one to one of the smallest fractional portion of the system clock signal is still considered to be at a rate greater that one second per second. The reader will further appreciate that increasing the frequency of a hardware based clock signal for purposes of testing race conditions in logic circuitry is not the same as advancing the system clock at a rate greater than one second per second.

Figure 8:
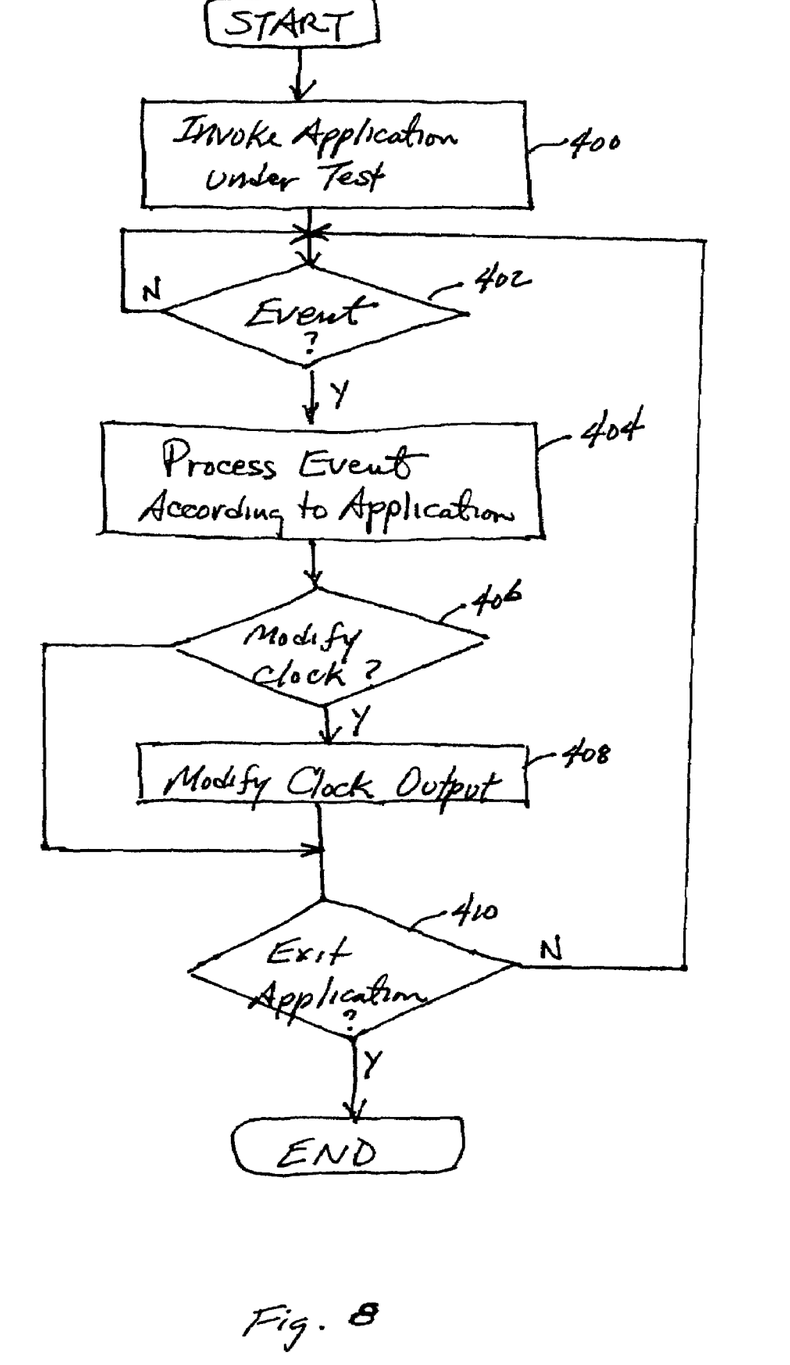
FIG. 8 is a flow chart illustrating the process performed by the system of the present invention.

Although the above described process may be initiated and monitored manually, in an alternative embodiment of the present invention, the exemplary testing scenario outlined in Table 1, including invocation of application 220, modules 230 and 240 may be automatically controlled by a test script application 250 which, in a Lotus notes environment, may be implemented with either a LotusScript or JavaScript wrapper or layer surrounding the application program interface of application 220. In such embodiment, the test script application 250 contains the commands for sequencing through the testing scenario. FIG. 8 is a flow chart illustrating the process performed by the system of the present invention. Specifically, application 220 is invoked by test script application 250, as illustrated by step 400. It is a good idea to start each test that uses time compression from a known system state, preferably a state that was reached through normal operation of application 220. Next, Event Simulation module 230 is invoked by test script application 250, which will check the system clock and generate an event, as illustrated by step 402. In the example described herein, such event may comprises any of a controlled set of document interactions, such as creating, responding to or, modifying a document. Thereafter, application 220 receives and processes the event by initiating of the spidering process followed by metrics processing so that the simulated day's documents are processed and affinity values are updated, as illustrated by step 404. Next, Clock Modification module 240 is invoked by test script application 250, and modifies the system clock, as illustrated by steps 406 and 408, which then sets the system clock ahead to the next day. The testing process continues until the test script application 250 instructs the application to be exited or suspended, as illustrated by steps 410. After the test completes, the system clock may be set back to the current time, and the application 220 can be restored to a known state from a backup. If the application/system is not occasionally returned to the present time, time-related errors may result. The above-described process allows compression of all of the behavior of interest into twenty minutes. Accordingly, the time in the test passed at a rate of three simulated days per hour. At such a rate, a year could be simulated in roughly five days.

Figure 4:
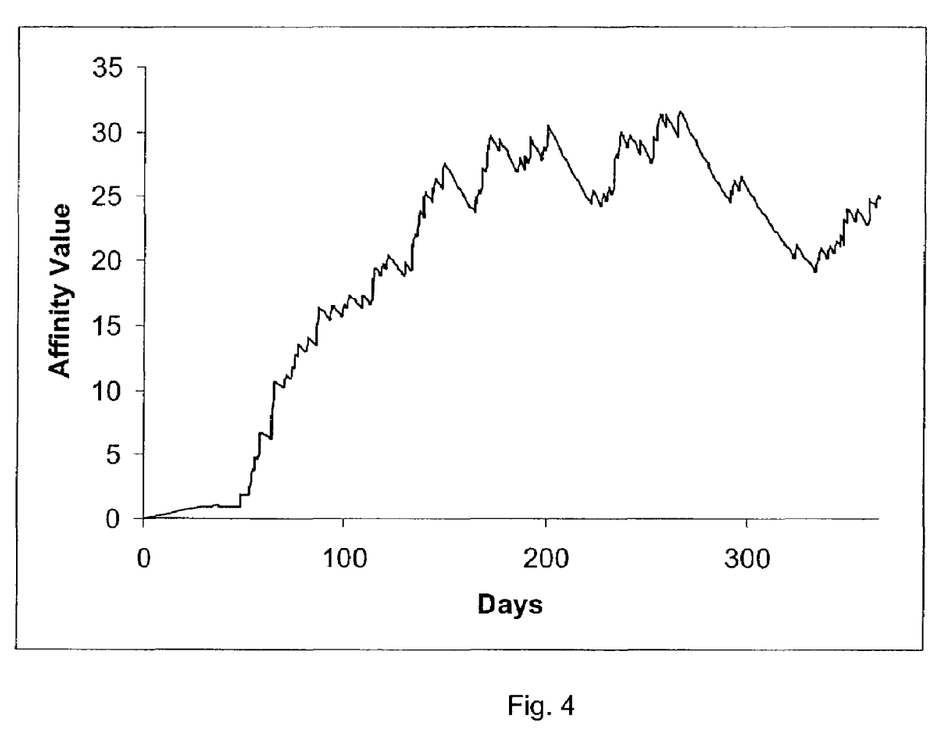
FIG. 4 illustrates conceptually the performance results of the software application of FIG. 3.

FIG. 4 illustrates hypothetical results of the Discovery Server 220 over a year of simulated time using the present system, for a hypothetical user who creates a document once every five days. The time between create events was modeled using a Poisson distribution of mean five, meaning that there are periods of bursty activity as well as periods of relative quiet. The model shows that the affinity value climbs initially, but eventually levels off. The leveling occurs because the influence of the decay increases as the affinity value gets larger. The model also shows that the affinity value can be expected to fluctuate, since the decay is applied only when no activity occurs within a category on a particular day. The "bursty" nature of Poisson inter-arrival times accounts for the long periods of quiet during which the affinity value drops.

The model therefore shows that the affinity system can have interesting long-term behaviors. The affinity does not level off until 120 simulated days have passed and the affinity value continues to fluctuate for the rest of the simulated year. Such a resulting behavior would take too long to observe and validate in a live system.

In another alternative embodiment of the present invention, the functionality of the Event Simulation module 230, Clock Modification module 240 and, optional test script application 250, can be designed into the software application 220 under test. Time compression testing can then become part of an overall strategy of designing for testability. In such embodiment, the existing scheduler function in the Discovery Server may be redesigned to support a "fast time" mode that is detached from the system clock of the operating system. To achieve this functionality, the Clock Modification module functionality is placed into an abstraction layer interface to hide calls to the time functions in the operating system. A simulation mode may then be built into the abstraction layer to accelerate the apparent passage of time without updating the system clock of the operating system. In this embodiment, a database of events can be used in conjunction with the application 220 when in the testing mode, in place of those generated by event simulator 230.

Figure 7:
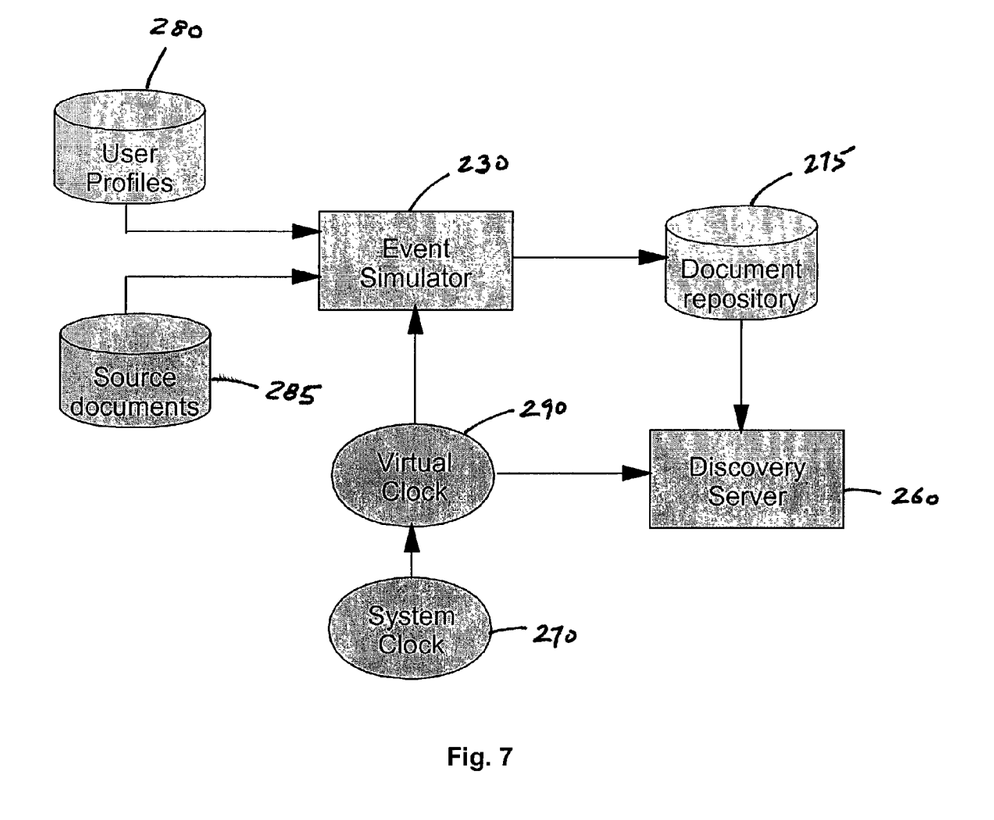
FIG. 7 illustrates conceptually an alternative implementation of the inventive system of FIGS. 5–6.

FIG. 7 illustrates how a "fast time" mode can be built directly into the application under test, here discovery server application 220, by using "virtual clock" instead of the system clock 270. Code in application 220 under test is modified to call the APIs in virtual clock module 290 instead of the system clock 270. The virtual clock 290 can run faster than the system clock 270, and, because the application 220 is isolated from the system clock 270, the application 220 behaves as if time is passing at a rate faster than real-time.

An example of pseudo-code for a scheduling loop in the application 220 is set forth below:

Once per minute:
    Call GetVirtualClockTime to get the current time value as
        maintained by the Virtual clock
        If (current virtual time is later than the time that the
            spiders are scheduled to run)
        Then
            Run spiders
        Else
            Do nothing
        end Many different implementations of GetVirtualClockTime are possible. One simple implementation algorithm is to obtain the actual time from the system clock 270 and multiple the actual time by some factor. For example, multiplying the actual system time by a factor of three means that virtual time passes at a rate of three times normal time, multiplying the actual system time by a factor of five means that virtual time passes at a rate of five times normal time, etc. Any scaling factor which causes the virtual clock to pass time at a rate greater than one second per second, i.e. normal time, can be used with the present invention. Accordingly, any application whose performance testing typically requires an extended period of time to react to events may have an accelerated testing mode designed therein using the technique of the present invention to present the necessary events within a compressed time period.

Network Environment

Figure 9:
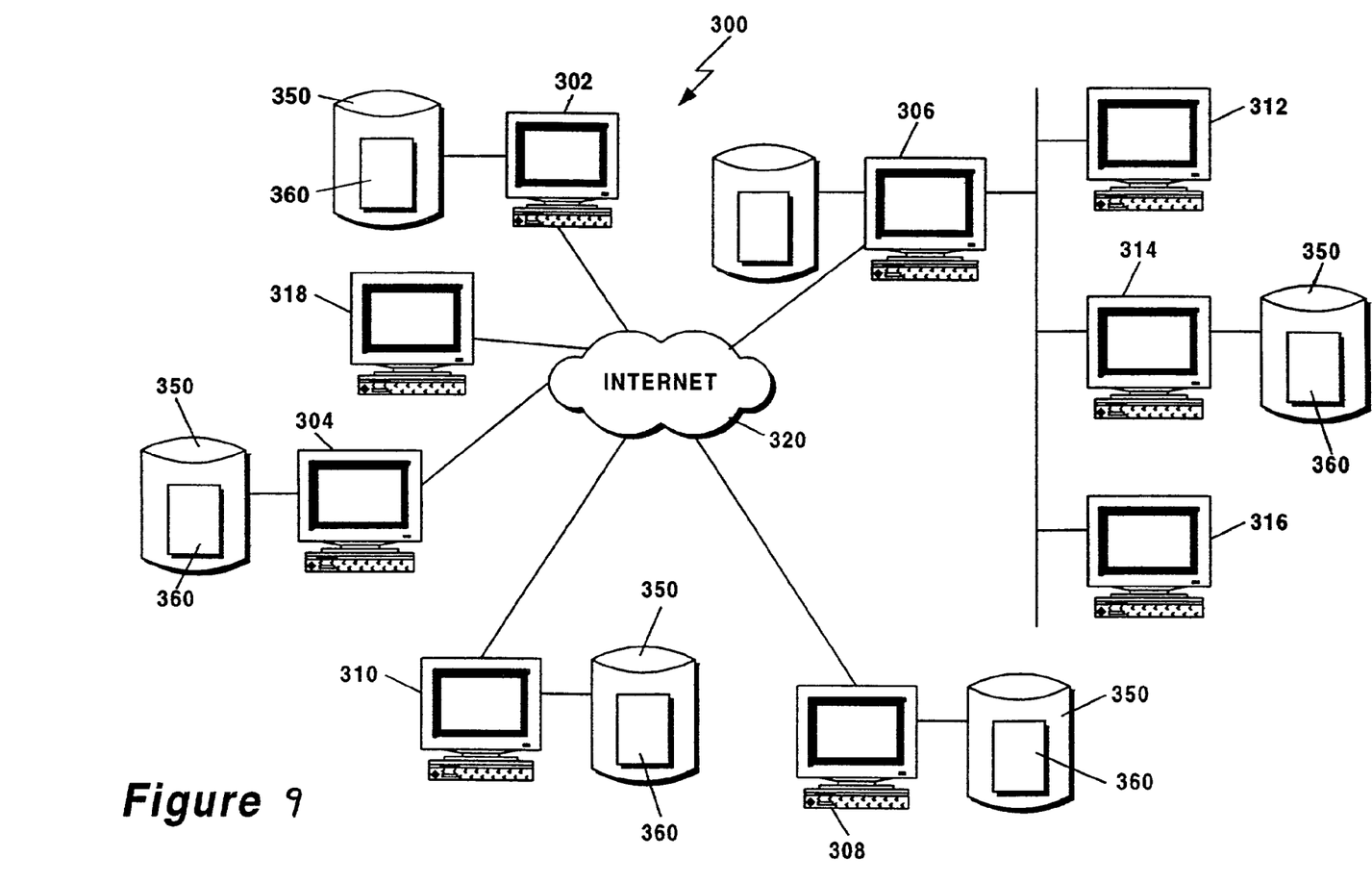
FIG. 9 is a conceptual illustration of a computer network environment in which the present invention may be utilized.

The present invention may also be implemented in a network environment. FIG. 9 illustrates a network environment in which the invention may be practiced, such environment being for exemplary purposes only and not to be considered limiting. Specifically, a packet-switched data network 300 comprises a servers 302–310, a plurality of processes 310–316 and a global network topology 320, illustrated conceptually as a cloud. One or more of the elements coupled to global network topology 320 may be connected directly or through Internet service providers, such as America On Line, Microsoft Network, Compuserve, etc. As illustrated, one or more process platforms may be located on a Local Area Network coupled to the Wide Area Network through one of the servers. Servers 302–308 may be implemented as part of an all software application which executes on a computer architecture similar to that described with reference to FIG. 1. Any of the servers may interface with global network 320 over a dedicated connection, such as a T1, T2, or T3 connection. The processes 312, 314, 316 and 318 may likewise be implemented as part of an all software application that run on a computer system similar to that described with reference to FIG. 1, or other architecture whether implemented as a personal computer or other data processing system. In such embodiment, the Clock Modification module 240 may execute on several servers simultaneously. If the servers start out with synchronized clocks, then the Clock Modification module 240 will advance the system clock on all servers at roughly the same time. In another alternative embodiment, a central time server may be designated to run the Clock Modification module 240 on the central time server. Such network implementations allow for testing of a single application that requires interaction with several applications or servers during the simulated test period.

The design reference point for most software in the world is at a rate of one second per second. Accordingly, changing the way time passes can create problems, and understanding the assumptions made by the developers about time is crucial to implementing time compression. One example is task scheduling, where server tasks might be intended to run at specified times, or after a certain number of clock "ticks". If a cleanup task is scheduled to run at 4:00 AM daily, that task would never run if the system clock jumped to the next day before 4:00 AM. Accordingly, designers need to take into account the overall effects of time compression of the application under test as well as the system on which the application is running.

In light of the above description, the reader can appreciate that time compression at a rate greater that one second of per second can also entail combinations of modifications to the system clock, including turning the clock back beyond the current time in addition to advancements of system clock ahead of the current time, provided the net effect on the application under test is that there is no longer a one to one ratio between the test time and the normal time generated by the system clock of the operating system.

From the above disclosure, the reader can further appreciate that time compression is effective in allowing observation of long-term system behavior in a short time frame, allowing identification of problems that would have been difficult to detect through traditional testing methods.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from International Business Machines Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for use with a computer system having an operating system executing thereon, the operating system capable of executing one of more applications and generating a system clock signal useful by one of the applications, the method comprising:
   (a) causing one of the applications to execute under control of the operating system;
   (b) providing one of a plurality of simulated events to the executing application;
   (c) selectively modifying the system clock signal generated by the operating system; and
   (d) providing the modified system clock signal to the executing application.

2. The method of claim 1 further comprising:
   (e) supplying an unmodified clock signal generated by the operating system to the application.

3. A method for use with a computer system having an operating system executing thereon, the operating system capable of executing one of more applications and generating a system clock signal useful by one of the applications, the method comprising:
   (a) causing one of the applications to execute under control of the operating system;
   (b) providing one of a plurality of simulated events to the executing application;
   (c) selectively modifying the system clock signal generated by the operating system by advancing the system clock signal at a rate greater than one second per second; and
   (d) providing the modified system clock signal to the executing application.

4. The method of claim 1 further comprising:
   (e) repeating (b) through (d).

5. The method of claim 3 wherein (c) comprises:
   (c1) selectively modifying the system clock signal by advancing the system clock signal at a uniform rate that is greater than one second per second.

6. The method of claim 3 wherein (c) comprises:
   (c1) selectively modifying the system clock signal by advancing the system clock signal at a nonuniform rate that is greater than one second per second.

7. A computer program product for use with a computer system having an operating system executing thereon, the operating system capable of executing one of more applications and generating a system clock signal useful by one of the applications, the computer program product comprising a computer usable medium having program code contained thereon comprising:
   (a) program code for causing one of the applications to execute under control of the operating system;
   (b) program code for providing one of a plurality of simulated events to the executing application;
   (c) program code for selectively modifying the system clock signal generated by the operating system; and
   (d) program code for providing the modified system clock signal to the executing application.

8. The computer program product of claim 7 further comprising:

(e) program code for supplying an unmodified clock signal generated by the operating system to the application.

9. A computer program product for use with a computer system having an operating system executing thereon, the operating system capable of executing one of more applications and generating a system clock signal useful by one of the applications, the computer program product comprising a computer usable medium having program code contained thereon comprising:
   (a) program code for causing one of the applications to execute under control of the operating system;
   (b) program code for providing one of a plurality of simulated events to the executing application;
   (c) program code for selectively modifying the system clock signal generated by the operating system by advancing the system clock signal at a rate greater than one second per second; and
   (d) program code for providing the modified system clock signal to the executing application.

10. The computer program product of claim 7 further comprising:
    (e) program code for repeating execution of (b) through (d).

11. The computer program product of claim 9 wherein (c) comprises:
    (c1) program code for selectively modifying the system clock signal by advancing the system clock signal at a uniform rate that is greater than one second per second.

12. The computer program product of claim 9 wherein (c) comprises:
    (c1) program code for selectively modifying the system clock signal by advancing the system clock signal at a nonuniform rate that is greater than one second per second.

13. An apparatus for use with a computer system having an operating system executing thereon, the operating system capable of executing one of more applications and generating a system clock signal useful by one of the applications, the apparatus comprising:
    (a) program logic for causing one of the applications to execute under control of the operating system;
    (b) program logic for providing one of a plurality of simulated events to the executing application;
    (c) program logic for selectively modifying the system clock signal generated by the operating system; and
    (d) program logic for providing the modified system clock signal to the executing application.

14. The apparatus of claim 13 further comprising:
    (e) program logic for supplying an unmodified clock signal generated by the operating system to the application.

15. An apparatus for use with a computer system having an operating system executing thereon, the operating system capable of executing one of more applications and generating a system clock signal useful by one of the applications, the apparatus comprising:
    (a) program logic for causing one of the applications to execute under control of the operating system;
    (b) program logic for providing one of a plurality of simulated events to the executing application;
    (c) program logic for selectively modifying the system clock signal generated by the operating system by advancing the system clock signal at a rate greater than one second per second; and
    (d) program logic for providing the modified system clock signal to the executing application.

16. The apparatus of claim 13 further comprising:
    (e) program logic for repeating execution of (b) through (d).

17. The apparatus of claim 15 wherein (c) comprises:
    (c1) program logic for selectively modifying the system clock signal by advancing the system clock signal at a uniform rate that is greater than one second per second.

18. The apparatus of claim 15 wherein (c) comprises:
    (c1) program logic for selectively modifying the system clock signal by advancing the system clock signal at a nonuniform rate that is greater than one second per second.

19. An apparatus for testing the performance of an application comprising:
    (a) a processor;
    (b) an operating system executing under control of the processor and configured to generate a system clock signal;
    (c) an application executing under control of the operating system;
    (d) a memory for storing data related to a plurality of simulated events; and
    (e) program logic for: i) providing data related to one of the plurality of simulated events to the executing application, ii) modifying the system clock signal, and iii) providing the modified system clock signal to the executing application, in a repeated sequence.

20. The apparatus of claim 19 further comprising:
    (f) program logic for supplying an unmodified clock signal generated by the operating system to the application.

21. An apparatus for testing the performance of an application comprising:
    (a) a processor;
    (b) an operating system executing under control of the processor and configured to generate a system clock signal;
    (c) an application executing under control of the operating system;
    (d) a memory for storing data related to a plurality of simulated events; and
    (e) program logic for: i) providing data related to one of the plurality of simulated events to the executing application, ii) modifying the system clock signal by advancing the system clock signal at a rate greater than one second per second, and iii) providing the modified system clock signal to the executing application, in a repeated sequence.

22. The apparatus of claim 21 wherein (e)(ii) comprises:
    (e1)(ii) program logic for modifying the system clock signal by advancing the system clock signal at a uniform rate that is greater than one second per second.

23. The apparatus of claim 21 wherein (e)(ii) comprises:
    (e1)(ii) program logic for modifying the system clock signal by advancing the system clock signal at a nonuniform rate that is greater than one second per second.

24. A system for testing the performance of an application, the system comprising:
    (a) a first computer system operatively coupled to a computer network and configured to execute an application under the control of an operating system, the application responsive to a clock signal generated by the operating system or from an external source;
    (b) a network clock signal source operatively coupled to the computer network for generating a network clock signal accessible over the computer network;

(c) a simulated events source operatively coupled over the computer network to the application executing on the first computer system and to the network clock signal source, the selected of the simulated events supplied to the application at predetermined clock signal values;

(d) program logic for selectively modifying the network clock signal generated by the network clock signal source and for providing the modified network clock signal to one of the executing application and the simulated events source, in a repeated sequence.

25. The apparatus of claim 24 further comprising:

(e) program logic for supplying an unmodified clock signal generated by the operating system to the application.

26. A system for testing the performance of an application, the system comprising:

(a) a first computer system operatively coupled to a computer network and configured to execute an application under the control of an operating system, the application responsive to a clock signal generated by the operating system or from an external source;

(b) a network clock signal source operatively coupled to the computer network for generating a network clock signal accessible over the computer network;

(c) a simulated events source operatively coupled over the computer network to the application executing on the first computer system and to the network clock signal source, the selected of the simulated events supplied to the application at predetermined clock signal values;

(d) program logic for selectively modifying the network clock signal generated by the network clock signal source (d1) program logic for modifying the network clock signal by advancing the network clock signal at a rate greater than one second per second and for providing the modified network clock signal to one of the executing application and the simulated events source, in a repeated sequence.

27. The apparatus of claim 26 wherein (d) comprises:

(d1) program logic for modifying the network clock signal by advancing the network clock signal at a uniform rate that is greater than one second per second.

28. The apparatus of claim 26 wherein (d) comprises:

(d1) program logic for modifying the network clock signal by advancing the network clock signal at a nonuniform rate that is greater than one second per second.

\* \* \* \* \*

UNITED STATES PATENT AND TRADEMARK OFFICE
CERTIFICATE OF CORRECTION

| | | |
|---|---|---|
| PATENT NO. | : 7,092,866 B2 | |
| APPLICATION NO. | : 10/279532 | |
| DATED | : August 15, 2006 | |
| INVENTOR(S) | : Vaughn T. Rokosz | |

It is certified that error appears in the above-identified patent and that said Letters Patent is hereby corrected as shown below:

Claim 1, line 11, change "one of more" to --one or more--.

Claim 3, line 27, change "one of more" to --one or more--.

Claim 7, line 53, change "one of more" to --one or more--.

Claim 9, line 6, change "one of more" to --one or more--.

Claim 13, line 38, change "one of more" to --one or more--.

Claim 15, line 55, change "one of more" to --one or more--.

Signed and Sealed this

Fifteenth Day of May, 2007

JON W. DUDAS
*Director of the United States Patent and Trademark Office*